INVENTORS,
CHARLES E. FARMAN
THOMAS C. GREEN
HURLEY D. PEPPER
SAMUEL SLONE

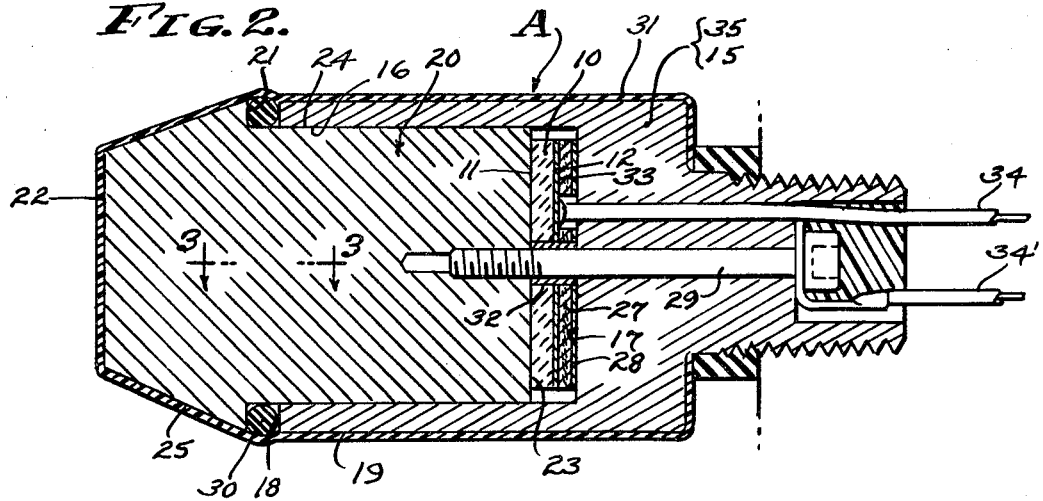
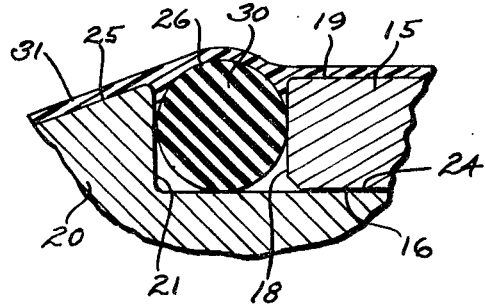
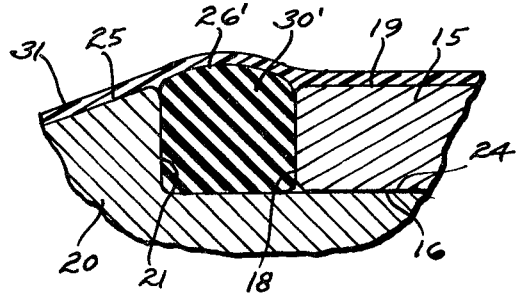

United States Patent Office 3,686,115
Patented Aug. 22, 1972

3,686,115
ULTRASONIC APPARATUS AND METHOD FOR THE PURIFICATION OF FLUIDS
Charles E. Farman, 1521 Roanne Drive, La Habra, Calif. 90631; and Thomas C. Green, Fullerton, Hurley D. Pepper, Long Beach, and Samuel Slone, Sepulveda, Calif.; said Green, Pepper, and Slone assignors to said Farman
Filed June 18, 1970, Ser. No. 47,438
Int. Cl. B01d 43/00
U.S. Cl. 210—19
12 Claims

ABSTRACT OF THE DISCLOSURE

A method and apparatus for the degassing of and continuous processing of liquid in a flow line to deactivate the shear susceptible chemical compounds and/or to kill the microorganisms contained therein. Polluted water containing shear susceptible chemicals and aerobic and/or anaerobic microorganisms is purified while in transit, by transferring energy into the moving liquid by means of an ultrasonic generator driving a transducer immersed in the liquid in a unique disposition, the impedance of the generator and immersed transducer per se being matched. A feature of the invention is the immersion of the transducer in liquid to be degassed and/or in the column of liquid being processed and its axial disposition focused in the direction of flow, and which affects the entire column of liquid in the flow line.

---

Figure 1:
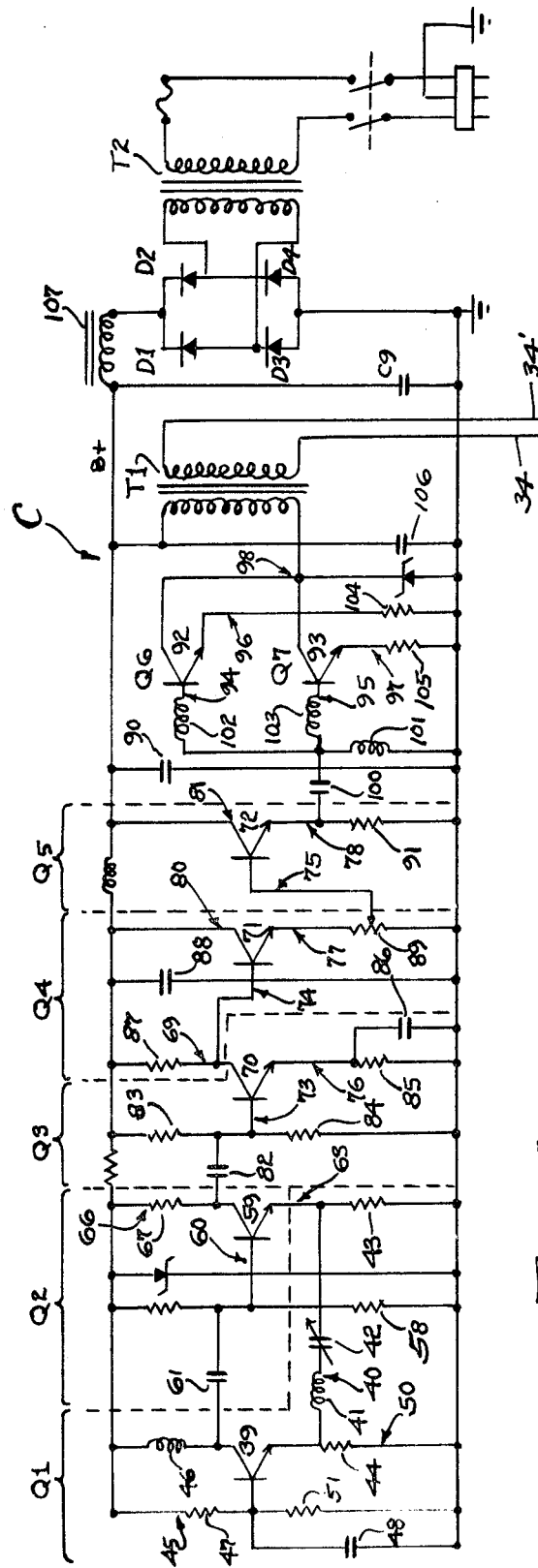
Figure 1:
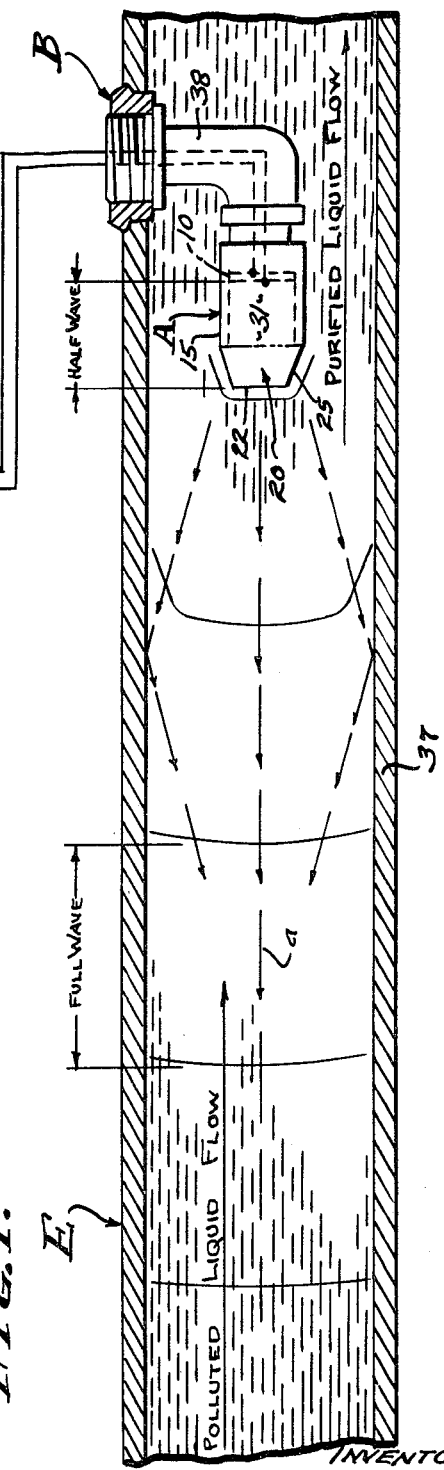

Polluted waters are becoming more of a problem and great quantities thereof are contaminated with respect to health requirements and are substandard. There are of course other fluids which require purification, however water is of the utmost importance and will be treated herein. Not only is water reclaimed but fluid displacement is practiced in hydraulic-geologic engineering wherein for example, waters are pumped subterraneously so as to prevent the sinking of land masses, and/or to prevent the encroachment of saline and other waters, and/or to displace fluids and other liquids, and/or to simply store the same etc. In any case, pollution and/or nonpotability is to be avoided for whatever use the water is to be put, since a high count of certain microorganisms in water is not only unhealthy to other life such as human well being, but also creates an environment which promotes corrosion clogging and the generation of gaseous and/or solid products. It is the substantial total killing of said aerobic and anaerobic microorganisms which is a primary object of this invention while operating at whatever flow rate and pressure may be involved and in no other way than through ultrasonics to treat the fluid for its substantially complete purification.

The general state of the art recognizes that when sonic energy is applied to water and the like, cavitation is produced in the form of fine bubbles, and that cavitation applied at sufficient energy levels results in rarefactions and compressions of waves through the liquid so as to cause a continuous formation and collapse of millions of microscopic vapor bubbles (cavities). It is generally accepted that exposure to cavitation as caused by ultrasonic vibration tends to kill most bacilli and weaken some viruses, and all of which is due to the increases in the implosion pressures and temperatures where the bubbles collapse. Although this phenomenon of cavitation is generally known to have its deleterious effects upon microorganisms a total kill is not necessarily produced thereby, it being an object of this invention to employ ultrasonics in a forceful way that a total kill of microorganisms is made possible. With the present invention, transient flow of liquid at high volume and under high pressure is subjected to focused pressure waves of sonic energy and the degree of kill can be total and/or controlled as circumstances require.

With the method and apparatus herein disclosed pressure waves of sonic energy are applied to water at a selectively controlled and optimum frequency and at a sufficient energy level to create structural failures in shear susceptible chemical compounds and within the physical body structures of microorganisms, resulting in what is referred to as a total kill. The effects are strongest at the transducer face, and the effect tends to weaken in proportion to the distance that the waves travel from the transducer face because of the expanding effect of the energy absorption into the liquid. Therefore, the use of multiple units is contemplated to be installed at critical locations so as to affect the entire column of moving water. The energy generator is controllable as to frequency and energy level, which are selectively adjustable to critical requirements involved with the mass and physical form of the microorganism as well as to requirements dictated by the size and flow rate of the column of fluid being treated. Since waters are the most prevalent of the contaminated liquids and because great quantities must be efficiently processed in applying the present invention to utilitarian purposes it is an object herein to accommodate any presently known volumetric flow through water handling apparatus and the like, and it is to this end that the present invention is directed.

Ultrasonics involves the application of wave energy, and in the case under consideration the application of wave energy in a liquid causes compression waves that have a shearing action operable against shear susceptible chemical compounds and microorganisms. Cavitation is ever present but is necessarily of small dimension (small vapor bubbles) while the positive pressure application is substantially large; and for this reason the energy application must necessarily be great and of a magnitude to have positive destructive force upon the chemical compounds and/or microorganisms. To this end therefore, the present invention has a twofold object, to effectively match the impedance of all elements and to adequately power a sonic transducer characterized by its concentrated area of energy application.

An object of this invention is to provide an apparatus of the character herein referred to with a unique transducer which is immersed in and of matched impedance with respect to the material (liquid load) which it is to process.

Another object of this invention is to provide an apparatus of the character herein referred to with an unique power supply which is capable of motivating a high power transducer in a light viscosity liquid such as water and the like.

The various objects and features of this invention will be fully understood from the following detailed description of the typical preferred form and application thereof, throughout which description reference is made to the accompanying drawings, in which:

FIG. 1 is a longitudinal sectional view illustrating the transducer insulation and power supply therefor. FIG. 2 is an enlarged detailed sectional view of the transducer shown in FIG. 1; and FIG. 3 is an enlarged detailed sectional view taken as indicated by line 3—3 on FIG. 2. FIG. 4 is a view similar to FIG. 3 showing a modified form.

This apparatus utilizes high frequency energy application for imposing destructive pressure waves against shear susceptible materials and microorganisms contained in diverse liquids. The object is to shear chemical compounds and/or to rupture and thereby kill aerobic and anaerobic microbes and the like all of which are prevalent in liquids such as water, for example in brackish waters and in sewage effluents. To these ends the apparatus involves the concentration of energy that is controllably applied within a flow line that transports the liquid, whereby virtually all transient liquid is subjected to said energy application of a magnitude that is effective to shear susceptible chemical compounds and to destroy living matter. It is to be understood that any living matter passing through the apparatus is to be adversely affected, including plant life such as algae and animal life as well. The effect of ultrasonics depends upon frequencies, power and mode of application, and to these ends the apparatus is preferably electronic and involves, generally, a transducer A, mounting means B for said transducer, and a generator C. The liquid is transported through a flow line E and an axially elongated section of said line is devoted to the installation of the apparatus, so that all liquid passing therethrough is subjected to the effects of ultrasonic energy. And, the transducer A is axially disposed in the flow line E by the mounting means B, and in accordance with the invention is imersed in the column of fluid as it passes therethrough.

As to the generation of sonic energy, it is to be understood that various known methods can be utilized, the use of electronics being most practical and in which case there is again a choice of transducers capable of converting electrical energy into sonic (vibrational) energy. Of the three generally accepted types of transducers, Piezoelectric, Magnestostrictive, and Electromagnetic, the first is preferred, the principles of the present invention being equally applicable to the other types of transducers. The instant transducer is to operate in the high frequency range between audible sound and 500 kc. and for example at 50 kc. The transducer is constructed to operate on an axis which is disposed in the direction of liquid flow to be treated and involves a driving disc 10, a housing 15 and a driver 20.

The driving disc 10 is the crystal to which the voltage and amperage is directly applied, and in practice is a disc of barium titanate of 1.125" diameter with parallel and opposite faces 11 and 12 spaced .187". An electrically conductive coating is applied to each of said faces 11 and 12 for receiving the electrical power as hereinafter described.

The housing 15 is an elongated cylinder disposed concentrically of the operative axis and coincidental with the axis of the driving disc 10. As shown, the housing 15 has a forwardly opening bore 16 that freely receives the driver disc 10 for axially expansible movement therein, said bore having a forwardly faced bottom 17 in a plane normal to the central operative axis and to be opposed by the rear face 12 of the driving disc 10. The housing 15 terminates in a smooth front face 18 disposed in a plane normal to the operative axis and extending between the bore 16 and outside diameter 19 of the housing.

The driver 20 characterizes the present invention and is formed to match (approximate) the high impedance of the driving disc 10 with the lower impedance of the liquid in which the transducer A is immersed. As shown, the driver 20 is a solid cylinder that rides free within the bore 16 to reciprocate with the driving disc 10. The driver is made of a stainless steel having a stepped outer diameter wall and opposite end faces 22 and 23 spaced 2.00 inches apart (approximately one half wave length at 50 kc.) and disposed in parallel planes normal to the central axis. In the embodiment shown for example, the driver is a solid 1.25 stepped to 1.50 inches diameter and 2.00 inches long, having a smooth minor diameter wall 24 slideably engaging in the bore 16 and having a smooth major diameter wall 25 of the same diameter as the outside diameter 19, of the housing. The walls 24 and 25 are connected by a shoulder 21 disposed in a plane normal to the operative axis and spaced from the face 18, and in the preferred embodiment the major diameter wall 25 is conical and tapered forwardly and inwardly at 20°–25° to the focusing face 22.

The radial extent of face 18 and shoulder 21, and the spacing thereof is such as to accommodate a seal 30 of elastomeric material that occupies the channel formed between face 18 and shoulder 21. In one form FIG. 2, the seal 30 is an O-ring, in which case the radial extent of the face 18 and shoulder 21 is substantially equal to or preferably greater than half the cross sectional diameter of said O-ring. Consequently, the outer half periphery 26 of the O-ring seal 30 projects from the outer diameter 19 and major diameter 25 while the seal body is elastic and embraced so as to permit its compression and rarefaction between the face 18 and shoulder 21. In a second form FIG. 3, the seal 30' is a modified O-ring type seal having an inner body portion of rectangular cross section with flat walls complementary to the face 18, shoulder 21 and major diameter wall 25 extending therebetween. Again, the outer arcuate periphery 26' of the O-ring type seal 30' projects from the outer diameter 19 and major diameter 25 while the rectangular inner body portion thereof fully occupies the channel to be embraced between the face 18 and shoulder 21.

In accordance with the invention, the housing 15 and driver 20 of the transducer A are encapsulated within a pliant skin 31 of flexible impervious material. In practice, the pliant skin 31 is applied as a coating or is vacuum-formed onto the housing and driver, with the seal 30 (30') in place between the face 18 and shoulder 21. As shown, the pliant skin 31 is of substantial thickness and hugs or clings to the contour of the outside diameter 19, to the arcuately projecting outer periphery of the seal 30 (30'), and to the major diameter 25. The pliant skin 31 is coextensive with the aforementioned feature and with the end face 22 of the driver 20, and is sealed against the mounting means B. In carrying out the invention the pliant skin 31 is applied as an epoxy coating or the like.

The assembly of the transducer elements 10, 15 and 20 is established and maintained by adhering the rear face 23 of the driver 20 to the front face 11 of the driving disc 10 using an electrically conductive cement. The rear face of the driving disc 10 is then seated upon a cushioning washer 27 of cork or the like which is in turn seated upon the bottom 17 of the housing bore with an insulator 28 of impervious dielectric material therebetween. This assembly is axially pre-stressed by a fastener 29 extended through an opening in the drive disc and threaded into the driver 20. The fastener 29 is electrically separated from the driving disc 10 by means of an insulating sleeve 32 and conducts current to the driver 20 for electric contact with face 11 of the Piezo driving disc 10 at the entire face 23. As shown, a contact disc 33 of copper or the like is interposed between the face 12 of the Piezo driving disc 10 and the washer 27, there being electric conductors 34 and 34' contacting the fastener 29 and the contact disc 33 respectively.

The drive face of the transducer A is the focusing face 22 of the driver 20 and which is immersed in the liquid to be pressured and facing the on-coming flow thereof.

The mounting means B can vary as required and is the foundation element for statically positioning the transducer housing 15. The embodiment shown involves a housing 15 that has a partition wall 35 common with the bore bottom 17 and through which the fastener 29 projects for access. Accordingly, the housing 15 is tubular for access and for the extension therethrough of the conductors 34 and 34'. In the embodiment shown the liquid flow to be treated is through the flow line E, for example a 4" inside diameter pipe 37, and the transducer A access is aligned with the central axis of said pipe or flow line, there being a tubular strut 38 that extends laterally to the side wall of the pipe 37 and which is fixedly anchored as shown and from which the conductors 34 and 34' emanates.

It will be seen that a high powered transducer A is immersed in the liquid to be processed and with its operative axis disposed in the direction of the liquid flow through pipe 37 of the flow line E. The active vibratory face 22 thereof faces the on-coming flow of liquid to be processed and in the case illustrated is substantially less than half the flow diameter within said pipe. This positioning of the exposed outer diameter wall 25 and focusing end face 22 disperses energy waves both axially and radially, all liquid passing through the pipe 37 being subjected to the vibratory affects of the transducer; and for assured effectiveness the above described installation can be duplicated at intervals along the section of pipe so modified in order to reach all shear susceptible chemical compounds and all microorganisms and living matter carried in said liquid. As a consequence, all matter is either sheared or ruptured; and in the case of shear susceptible chemical compounds such as long-chain complex polymers, for example soaps, detergents, enzymes and the like they are disassociated and reduced to their constituent parts thereby to make new compounds no longer resembling the soaps and foaming agents; or in other words splitting them into a plurality of compounds; and in the case of live organisms such as bacteria, algae, protozoa, fungi, virus and related bodies, they are subjected to rupturing forces that render them lifeless, inert and no longer quick. Thus, chemical structure and living structure are arrested although not destroyed.

The generator C is a transistor oscillator and amplifier capable of delivering relatively high power (in excess of 450 watts) and involves multiple stages Q1 through Q7 and a power supply P. There is at least one oscillator stage Q1 followed by a multiplicity of amplifier stages which may vary in number, a feature of the circuitry being the arrangement of the oscillator Q1 and following plus amplifier stages, and by the pair of final output stages arranged complementary. The power supply P provides full wave rectification and involves a transformer T2 with its primary winding in a power circuit and with its secondary winding feeding a bridge circuit of diodes D1–D4. The direct current power is then supplied to a B+ buss through a choke, there being a capacitor C9 therefrom to the ground buss. The transistors employed herein are NPN and the arrangement of oscillator stage, series amplifier states and final complementary stages results in a power or wattage output amply sufficient to drive the transducer A in its environment as hereinabove described and for the purposes intended.

The oscillator stage Q1 is an electronic oscillator which acts as an automatic alternating current voltage generator involving, generally, an NPN transistor 39, a variably tuned input circuit 40, a feedback circuit 45, and a collector (output) circuit 50. The tuned input circuit 40 eminates from the emitter and comprises a choke 41 and a variable capacitor 42 in series and connected to the ground buss through a series resistor 43. Also, the tuned input circuit involves a resistor 44 between the emitter and the ground buss. The feedback circuit 45 comprises a choke 46 from the collector and a resistor 47 in series therewith to the base. A base capacitor 48 discharges through the resistor 47 to the B+ buss. There is also a resistor 51 to the ground buss; and the collector circuit 50 comprises a conductor to the next stage Q2. There electronic components and others that may be required to achieve a balanced and operative circuit are preferably connected as shown in FIG. 1 of the drawings.

The amplifier stage Q2 is a single ended NPN transistor amplifier which initially increases the power output from the oscillator stage Q1, and involves generally, an NPN transistor 59, a base circuit 60, an emitter circuit 63 and a collector circuit 66; the oscillator signal being applied to the base of the transistor 59 through a capacitor 61, the capacitor and base discharging through a resistor 58 from the base to the ground buss. The emitter circuit 63 involves the resistor 43 to the ground buss, and the collector circuit 66 involves a resistor 67 to the B+ buss and a conductor directly to the following stage Q3. These electronic components and others that may be required to achieve a balanced and operative circuit are preferably connected as shown in FIG. 1 of the drawings.

The series amplifier stages Q3, Q4 and Q5 are interdependent NPN transistor amplifiers which controllably increase the power output from the oscillator stage Q1 and initial amplifier stage Q2. The series stages Q3, Q4 and Q5 operate cooperatively and involves generally, NPN transistors 70, 71 and 72; base circuits 73, 74 and 75; emitter circuits 76, 77 and 78; and collector circuits 79, 80 and 81. The amplified signal from Q2 is applied to this series of transistor amplifiers through a capacitor 82 to the base of transistor 70. The base of transistor 70 is connected to the B+ buss through a resistor 83, and there is also a resistor 84 therefrom to the ground buss. The emitter circuit 76 is connected to the ground buss through a resistor 85 and a capactior 86 in parallel; while the collector circuit 79 extends to the following stage Q4. The amplified signal from the collector of Q3 is applied directly to the base of transistor 71 which is also connected to the B+ buss through a resistor 87. The collector circuit 80 is connected directly to the B+ buss with a capactior 88 therefrom to the ground buss; and the emitter circuit 77 extends to the ground buss and to the following stage Q5 through a variable resistor 89. The amplified signal from the emitter (reversely connected as compared with the preceding stages) is controllably applied by means of variable resistance 89 to the base of transistor 72. The collector circuit 81 is connected directly to the B+ buss with a capacitor 90 therefrom to the ground buss; and the emitter circuit 78 extends to the ground buss through a resistor 91 and to the following parallel stages Q6 and Q7. These electronic components and others that may be required to achieve a balanced and operative circuit are preferably connected as shown in FIG. 1 of the drawings.

The complementary amplifier stages Q6 and Q7 are interdependent NPN transistor amplifiers which double the power output from the power controlled series of amplifiers Q3, Q4 and Q5. The parallel stages Q6 and Q7 operate cooperatively and involve generally, NPN transistors 92 and 93; base circuits 94 and 95; emitter circuits 96 and 97; and a collector circuit 98. The controllably amplified signal from Q5 is applied to the bases of the two transistors 92 and 93 through a capacitor 100 with a choke 101 therefrom to the ground buss, there being individual chokes 102 and 103 in the base circuits 94 and 95 respectively. The emitter circuit 96 extends to the ground buss through a resistor 104 while the emitter circuit 97 extends to the ground buss through a resistor 105. Finally, the output of the two parallel amplifiers Q6 and Q7 extends from the two collectors through the common circuit 98 and to the primary winding of an output transformer T1, the said primary winding being connected to the B+ buss at or intermediate the power supply connection thereto and said buss connection to the stages Q1 through Q5. As shown, there is a capacitor 106 across the busses at the power supply, and there is a choke 107 between the bridge circuit (D1 and D2) and said capacitor 106. These electronic components and others that may be required to achieve a balanced and operative circuit are preferably connected as shown in FIG. 1 of the drawings. The conductors 34 and 34' extend to the transducer A from a secondary winding of transformer T1.

In accordance with this invention the driver 20 is preferably made to a nominal one-half wave length of the wave frequency length of oscillation at which it is to be operated, taking into account its mass and the medium in which it is immersed. In the case under consideration the generator C is tuned to drive at 50 Kc and the medium in which it is immersed is polluted water, in which case the solid stainless steel driver of 1.25 inch diameter with its tapered outer diameter wall 25 and two inch length is most effective. From FIG. 1 of the drawings it will be seen that shock waves of full wave length eminate from the driver face 22 and progress axially with diminishing effect; while similar waves emanate radially and forwardly from the tapered outer diameter wall 25 and progress diagonally to impinge upon and reflect from the inside diameter wall of the pipe 37 for its continued diminishing effect. In practice, it has been determined that effective shearing and destructive action upon shear susceptible compounds and living organisms extends multiple wave lengths as clearly illustrated in FIG. 1 (the diminishing effect being depicted by the fineness of the wave indicating lines), the depth of penetration vary with the wave length and liquids involved. It is to be understood that the materials to be processed can vary widely, as liquids per se or as liquids employed as a vehicle to carry materials such as gases or solids that are to be purified and subsequently separated from the vehicle.

From the foregoing it will be seen that a nontoxic nonchemical method and apparatus is provided for the purification of fluids containing shear susceptible chemical compounds and/or living organisms carried or in solution therein. The transducer A is immersed in the fluid as it is transported through a flow line E and a feature of the invention is that impedance is minimized through the direct application of wave energy from the transducer into the fluid being processed. That is, the active transducer faces 22 and 25 engageably react with the fluid in which they are immersed and from which energy waves emanate along the axis *a* of transducer movement. Said axis *a* is either coincidental with or parallel to the columnar axis of fluid flow wave energy is dispersed along said axis to a practical infinity; an infinite distance to which the wave energy is effective for the destructive purposes intended. The apparatus is effectively operative in environments, such as for example in the processing of polluted waters entering through a 4" pipe line at 100 gallons per minute at 1,000 p.s.i. and from which it is delivered in a purified condition, due to the exposure of all fluid and soluble shear susceptible chemicals and living organisms to the radiated wave energy that is dispersed along the axis *a*. In the event that the pipe line E is of large diameter, it is then anticipated that a cross sectional grid comprised of a plurality of transducers A is to be employed and to the end that there is sufficient dispersion of wave energy laterally of multiple axes *a* in order to expose the entire cross section to the destructive wave energy that is effective to shear and rupture the susceptible chemicals and life respectively.

It has been discovered that the method and apparatus hereinabove disclosed is useful in degassing liquids in which gases are in solution, and to this end the application of the transducer A to gas laden liquids is effective; especially in liquids held at minimum pressures when subjected to the intense ultrasonic frequencies, for example when the liquid is subjected to vacuum pressures.

The frequency and intensity is infinitely variable within the operational ranges hereinabove specified, and which are selectively employed so as to effect any particular critically involved mass to be sheared or killed. In actual practice, total destruction of shear susceptible masses and total kill of living organisms is realized. The transducer unit is constructed of substantially impervious and durable materials, such as stainless steel; and the incapsulating material can vary as circumstances require, a polyurethane coating being employed for moisture protection, for example, when water is involved. As shown, the conductors 34–34' are potted within an epoxy or polyurethane plug that embraces them where they emanate from the unit.

Having described only typical preferred forms and applications of our invention, we do not wish to be limited or restricted to the specific details herein set forth, but wish to reserve to ourselves any modifications or variations that may appear to those skilled in the art;

Having described our invention, we claim:

1. An ultrasonic apparatus for applying destructive force to shear susceptible materials and to living matter, and including: an elongated axially disposed cylindrical flow line having a central operational axis and having means for effecting transient movement of a liquid, a transducer comprised of a forwardly convergent cone-shaped driver mass with a flat circular frontal face concentric with and normal to said operational axis and fixedly positioned within said flow line for immersion in said liquid, said driver mass constructed for focused reflection of shock waves forwardly and axially therealong, said transducer having means to axially reciprocate the driver thereof at high frequencies on said operational axis and powered by a high frequency generator means with an energy output establishing shock waves of a magnitude destructive to shear susceptible materials and living matter by the explosive and implosive forces thereof.

2. The ultrasonic apparatus for destroying shear susceptible materials and living matter as set forth in claim 1, wherein the driver mass of the transducer has an axial thickness of nominally one-half wave length therein at the frequency of operation.

3. The ultrasonic apparatus for destroying shear susceptible materials and living matter as set forth in claim 1, wherein the driver mass of the transducer has an axial thickness of nominally one-half wave length therein at the frequency of operation and has a transverse cross section of nominally one-quarter wave length therein at the frequency of operation.

4. The ultrasonic apparatus for destroying shear susceptible materials and living matter as set forth in claim 1, wherein the driver mass of the transducer has an axial thickness of nominally one-half wave length therein at the frequency of operation and has a transverse cross sectional diameter of nominally one-quarter wave length therein at the frequency of operation.

5. An electrically powered ultrasonic transducer for immersion in and for applying destructive force to liquid carrying shear susceptible materials and living matter, and including; an elongated axially disposed housing with a bore therein on its operational axis and opening at one end of the housing, an electrically conductive driver reciprocably carried in said bore and having an end engageably exposed to the liquid in which the transducer is immersed, a seal between the housing and the driver where the driver enters said bore, and electrically powered means within said bore at the other end of the housing to reciprocate the driver at high frequencies on said operational axis and comprising a piezo element disposed in a plane normal to the operational axis and with one side electrically and mechanically engaged against a planar end of the driver and with its other side in electrical contact with one power lead, the driver being in electrical contact with a second power lead, whereby shear susceptible materials and living matter are destroyed by shock waves and the explosive and implosive forces thereof.

6. The electrically powdered transducer for immersion in liquid to be affected thereby as set forth in claim 5, wherein the said one side of the piezo element is electrically and mechanically bonded to said planar end of the driver and with its other side seated on a bottom in the housing bore, the said one power lead being insulated from the housing.

7. The electrically powered transducer for immersion in liquid to be affected thereby as set forth in claim 5, wherein the said other side of the piezo element is seated on an axially resilient pad at a bottom in the housing bore, the said one power lead being insulated from the housing.

8. The electrically powered transducer for immersion in liquid to be affected thereby as set forth in claim 5, wherein the said other side of the piezo element is seated on an axially resilient pad at a bottom in the housing bore, the said one power lead being insulated from the housing, and wherein means yieldingly urges said driver onto the resilient pad for reciprocable motion on the operational axis.

9. The electrically powered transducer for immersion in liquid to be affected thereby as set forth in claim 5, wherein the said other side of the piezo element is seated on an axially resilient pad at a bottom in the housing bore, the said one power lead being insulated from the housing, and wherein an axially disposed fastener secures the driver to the housing and is under tension and is prestressed to yieldingly urge the driver onto the resilient pad for reciprocable motion on the operational axis.

10. The electrically powered transducer for immersion in liquid to be affected thereby as set forth in claim 5, wherein the said other side of the piezo element is seated on an axially resilient pad at a bottom in the housing bore, and wherein an electrically insulated fastener projects through the piezo element and in electrical contact with one power lead and to secure the driver to the housing and under tension and prestressed to yieldingly urge the driver onto the resilient pad for reciprocable motion on the operational axis.

11. A method for destructing shear susceptible materials and living matter in liquid solution, and including; continuously transporting said materials and matter laden liquid in an axial direction confined within a reflective channel wall and generating forceful ultrasonic shock waves of a magnitude destructive to shear susceptible materials and living matter and focused to eminate and progress axially and reflectively along said channel wall, thereby destroying said shear susceptible materials and living matter transported along said axial direction and within effective focus of said shock waves.

12. The method of destroying shear susceptible materials and living matter as set forth in claim 11, wherein the liquid transport is confined within reflective channel walls and wherein the shock waves are focused to progress axially and reflectively along said channel walls to remain effective within said liquid transport.

References Cited

UNITED STATES PATENTS

| | | | |
|---|---|---|---|
| 2,417,722 | 3/1947 | Wolff | 210—19 |
| 3,474,403 | 10/1969 | Massa et al. | 340—10 |
| 3,230,503 | 1/1966 | Elliot, Jr. et al. | 340—10 |
| 3,200,567 | 8/1965 | May | 210—19 X |
| 2,578,673 | 12/1951 | Cashman | 210—19 X |
| 3,166,619 | 1/1965 | Coyle | 340—10 X |
| 3,149,301 | 9/1964 | Green | 340—10 X |
| 2,163,649 | 6/1939 | Weaver | 210—19 X |
| 3,517,226 | 6/1970 | Jones, Sr. | 340—8 L |

REUBEN FRIEDMAN, Primary Examiner

F. F. CALVETTI, Assistant Examiner

U.S. Cl. X.R.

340—10